No. 677,831. Patented July 2, 1901.
A. E. WHITING.
LEG ROPE ATTACHMENT FOR SECURING COWS FOR MILKING OR THE LIKE.
(Application filed Nov. 3, 1900.)
(No Model.)
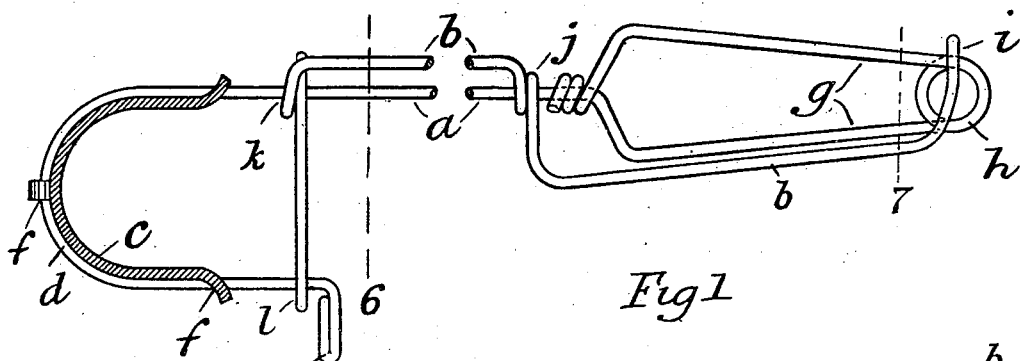
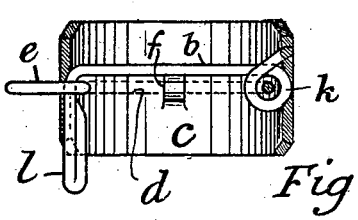
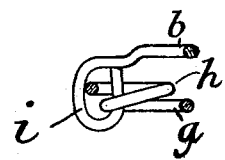
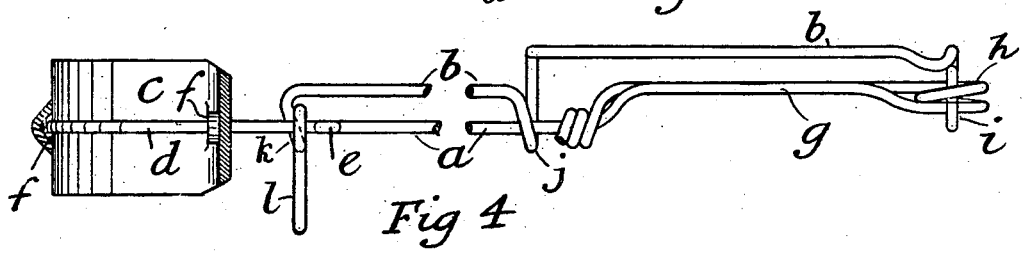
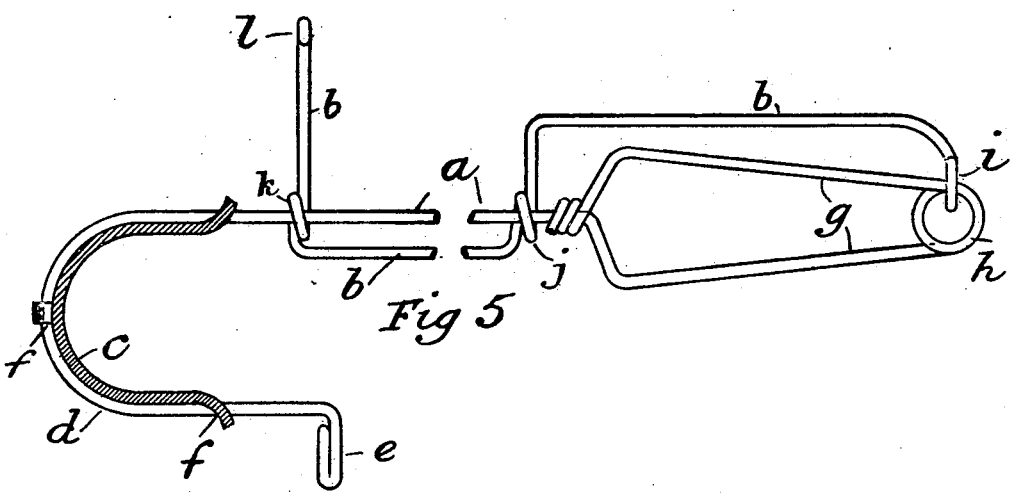

UNITED STATES PATENT OFFICE.

ALBERT EDWIN WHITING, OF HEXHAM, VICTORIA.

LEG-ROPE ATTACHMENT FOR SECURING COWS FOR MILKING OR THE LIKE.

SPECIFICATION forming part of Letters Patent No. 677,831, dated July 2, 1901.

Application filed November 3, 1900. Serial No. 35,369. (No model.)

*To all whom it may concern:*

Be it known that I, ALBERT EDWIN WHITING, a subject of the Queen of Great Britain and Ireland, residing at Hexham, in the Colony of Victoria, have invented certain new and useful Improvements in Leg-Rope Attachments for Securing Cows for Milking or the Like; and I do hereby declare the following to be a full, clear, and exact description of the invention, such as will enable others skilled in the art to which it appertains to make and use the same.

The object of this invention is to enable the operation of what is called "leg-roping" cows to be performed with celerity and without danger or inconvenience. This operation, which precedes milking, is usually effected by means of an ordinary rope; but by my invention I use a metal appliance, at one end of which the cow's leg is held, while at the other end there is a connection (by rope or otherwise) to the stall in order to keep the leg of the cow in the desired position. The appliance I use may vary in size, but is usually from two to three feet long; one end forming a handle. There is a main rod which extends the aforesaid length, and there is connected to it what I call a "locking rod or wire," adapted to be moved relatively to the main rod by any person holding the said handle, the thumb being adapted to perform the said movement. This locking-rod has normally a closed position, and when moved therefrom into the open position it has a tendency to spring back into the closed position. The person desiring to "leg-rope" a cow will hold the appliance by its handle, with the locking or movable rod in the open position—that is, leaving open the mouth of a hooked part of the main rod, which is situated at the other end of the appliance. This hooked part is then passed around the cow's leg, and the operator allows the movable part to spring closed and then fastens the handle (or a rope attached thereto) to the stall in any suitable position. The cow will then be secured in position and unable to release her leg from the hook.

Referring now to the accompanying sheet of drawings, in which my invention is illustrated, (the middle plain part of the appliance being omitted to enable other parts to be shown upon a conveniently large scale,) Figure 1 is a plan view of the appliance in closed position. Fig. 2 shows an elevation in vertical section on the line 6, Fig. 1, looking in the direction of the hook. Fig. 3 shows a vertical section on the line 7, Fig. 1, looking toward the near end. Fig. 4 is a side elevation of the parts in Fig. 1, and Fig. 5 shows the parts in Fig. 1 in the open position.

In the views, $a$ represents the main rod, having at different portions thereof various distinguishing features, hereinafter set forth, and $b$ is the movable or locking rod or wire, connected to $a$. The portion of the rod $a$ which forms the hook is marked $d$, the end of which, $e$, is turned outward, as seen in Fig. 1, and upon this hook is secured a pad or guard $c$, intended to contact with the cow's leg to prevent the same from being injured. Slits $f$ in the pad $c$ allow the pad to be connected to the hook $d$. At the other end of rod $a$ is a handle $g$, having at or near its extremity a ring $h$. One extremity of the rod $b$ has also a ring $i$, which engages with one side of the ring $h$. The rod $b$ has also two other rings, $j$ and $k$, loosely encircling that part of rod $a$ which is between the handle and the hook. The extremity of rod $b$, at its end near the hook $d$, is bent transversely and then downward, as shown by $l$ in Fig. 2, so that the bends $e$ and $l$ form a catch completely closing the hook. When my appliance has its parts in the closed position, any cow having its leg in the hook will be unable to release its leg. It will be observed that in Fig. 1 the ring $i$ is not in the same axial line as the two rings $j$ $k$, and it is this arrangement of the rings and rods $a$ $b$ (both somewhat flexible) which gives rod $b$ when opened a tendency to spring into the closed position.

The catch at $l$ may be eased or tightened at any time owing to the springiness of the hook part $d$.

Various minor modifications in the construction may be made within the scope of this invention.

What I claim as my invention, and desire to secure by Letters Patent of the United States, is—

1. In an appliance of the class indicated, a main rod having at one end a hook and at the other a handle and a ring on said handle, in combination with a movable or locking rod pivotally connected to the main rod between the handle and the hook, also at one end pivotally connected to the ring on the said handle, and having its other extremity bent transversely, and then downward, forming a catch completely closing the said hook all substantially as set forth.

2. In an appliance of the class indicated, a main rod, having a handle and a hook, in combination with a pad on said hook and attached to said main rod, a locking-rod pivoted at two points on the main rod, said pivots being out of alinement with each other, the extremity of the locking-rod adapted to close the said hook, the locking-rod being adapted to be moved by manipulation at the said handle into the open position, the unalined pivots thereby distorting the parts, whereupon the locking-rod has a tendency to spring closed, substantially as set forth.

In testimony whereof I affix my signature in presence of two witnesses.

ALBERT EDWIN WHITING.

Witnesses:
G. G. TURRI,
B. M. LOWE.